United States Patent
Bessette et al.

(10) Patent No.: US 8,240,782 B2
(45) Date of Patent: Aug. 14, 2012

(54) TRACTION ASSEMBLY

(75) Inventors: Robert Bessette, St-Charles de Drummond (CA); Louis-Frédéric Marchildon, St-Charles de Drummond (CA)

(73) Assignee: Soucy International Inc., Drummondville (CA)

( * ) Notice: Subject to any disclaimer, the term of this patent is extended or adjusted under 35 U.S.C. 154(b) by 163 days.

(21) Appl. No.: 12/550,894

(22) Filed: Aug. 31, 2009

(65) Prior Publication Data
US 2011/0048817 A1    Mar. 3, 2011

(51) Int. Cl.
B62D 55/00    (2006.01)
B62D 55/14    (2006.01)

(52) U.S. Cl. ..................... 305/131; 305/135

(58) Field of Classification Search ............. 305/20, 305/124–131, 134–135, 120; 180/9.1, 9.21
See application file for complete search history.

(56) References Cited

U.S. PATENT DOCUMENTS

| | | | | |
|---|---|---|---|---|
| 5,607,210 A * | 3/1997 | Brazier | ...................... | 305/131 |
| 6,761,236 B2 * | 7/2004 | Hibbert | ...................... | 180/9.52 |
| 7,226,136 B2 * | 6/2007 | Blanchard | ...................... | 305/127 |
| 2006/0181148 A1 * | 8/2006 | Bessette | ...................... | 305/124 |
| 2008/0156548 A1 * | 7/2008 | Mallette et al. | ............... | 180/9.1 |
| 2009/0267407 A1 * | 10/2009 | Bessette | ...................... | 305/135 |

* cited by examiner

Primary Examiner — Jason Bellinger
(74) Attorney, Agent, or Firm — Brouillette & Partners; Francois Cartier; Robert Brouillette

(57) ABSTRACT

The present invention generally provides a wheel replacing traction assembly which uses, for propulsion, a longitudinally extending endless track disposed around and cooperating with a sprocket wheel, idler and road wheels, and a guide rail.

20 Claims, 5 Drawing Sheets

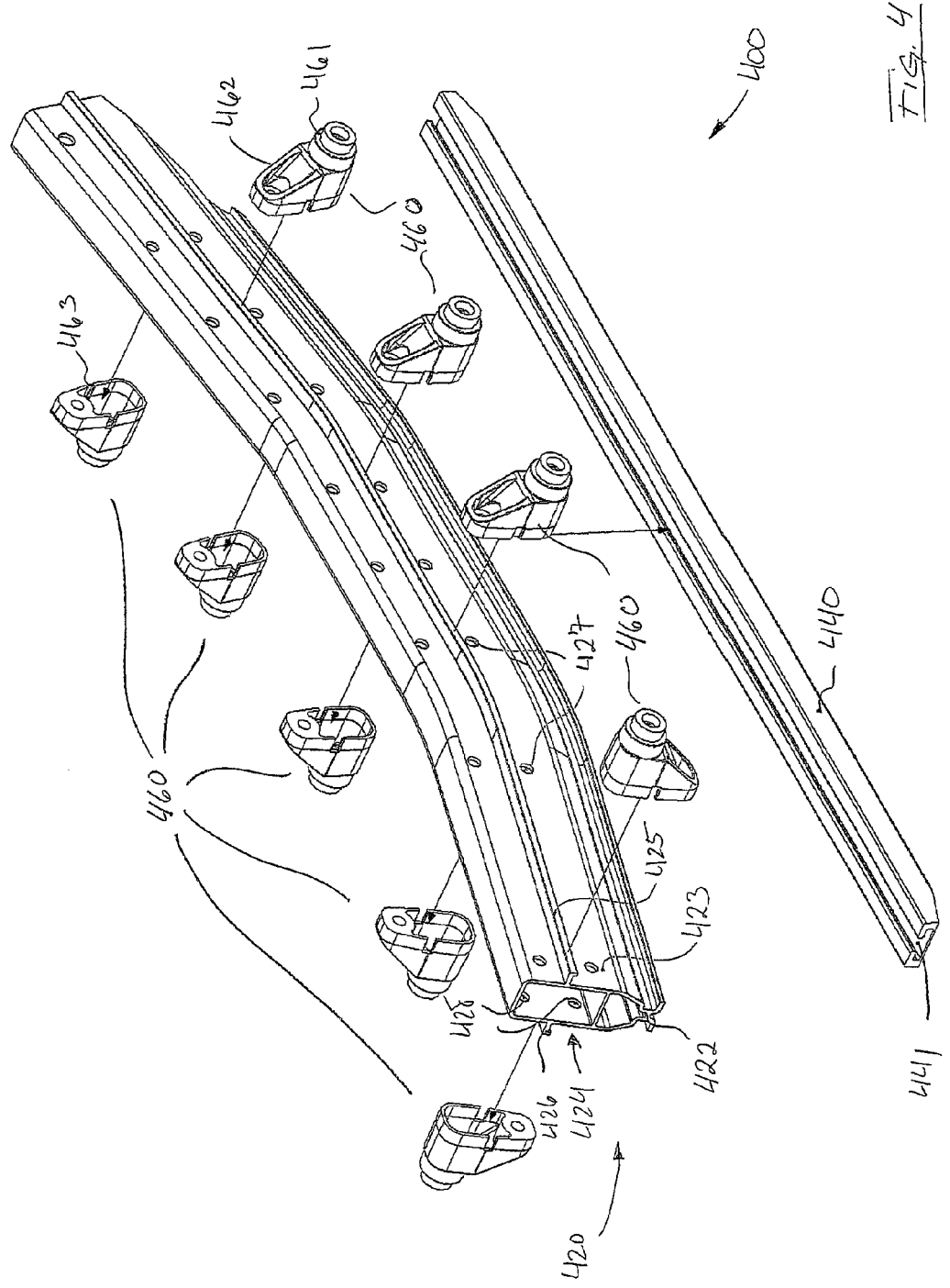

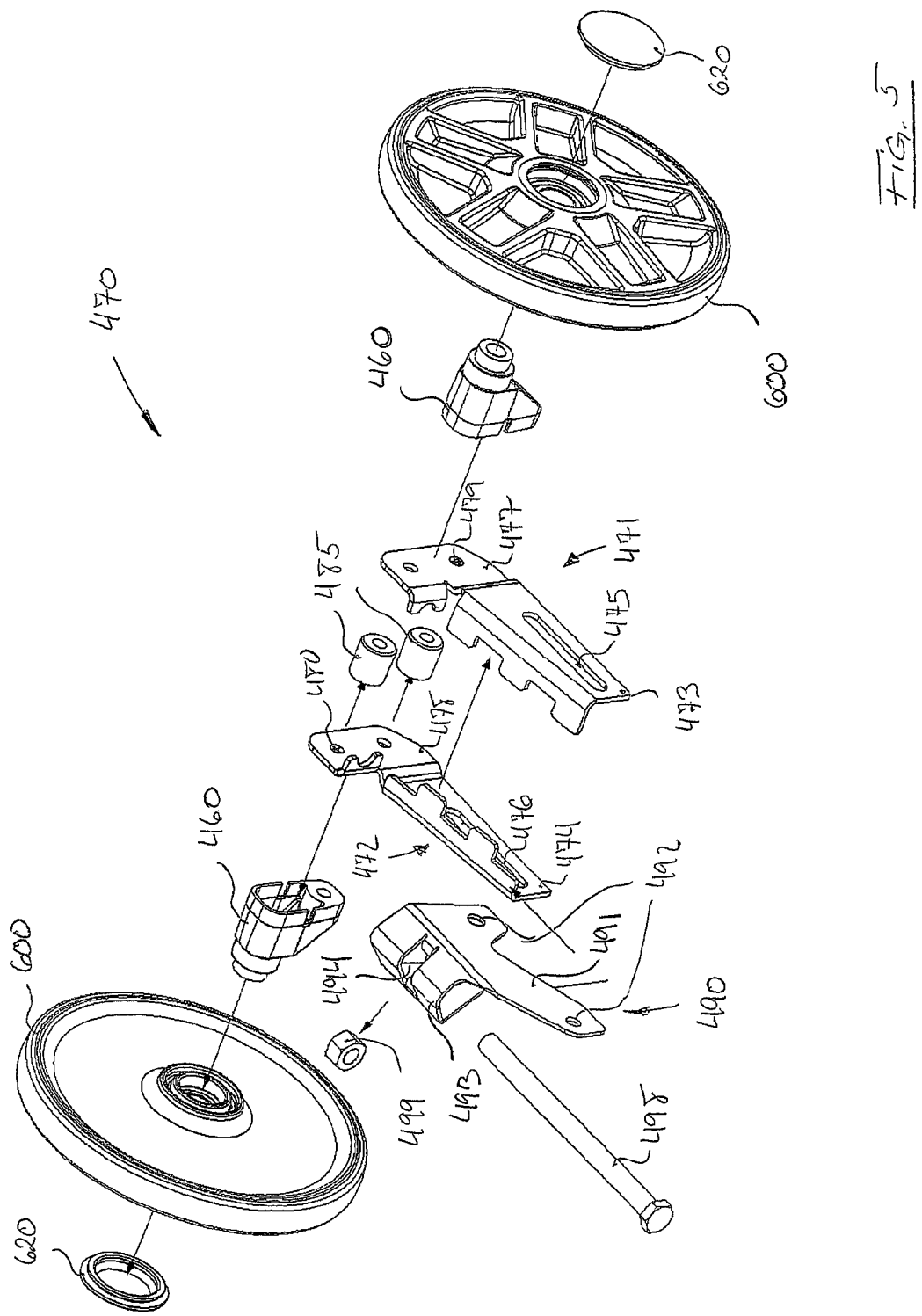

TRACTION ASSEMBLY

CROSS-REFERENCE TO RELATED APPLICATIONS

There are no cross-related applications.

FIELD OF THE INVENTION

The present invention generally relates to traction assemblies typically used as wheel replacements for wheeled vehicles.

BACKGROUND OF THE INVENTION

Traction assemblies for use as wheel replacement on wheeled vehicles are known in the art. Indeed, several configurations of traction assemblies have been proposed throughout the years in order to generally improve different aspects and characteristics such as the riding behaviour.

Nevertheless, prior art traction assemblies still suffer from several drawbacks. Consequently, there is still room for further improvements.

SUMMARY OF THE INVENTION

The principles of the present invention are generally embodied in a traction assembly which uses, for propulsion, a longitudinally extending endless track disposed around and cooperating with a sprocket wheel, idler and road wheels, and a guide rail. The guide rail, to which are mounted the idler and road wheels, is coupled to the sprocket wheel via a frame.

The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which:

FIG. 4 is an exploded view of the guide rail of traction assembly of FIG. 1.

FIG. 5 is an exploded view of the track tensioning assembly of traction assembly of FIG. 1.

DETAILED DESCRIPTION OF THE PREFERRED EMBODIMENT

A novel traction system will be described hereinafter. Although the invention is described in terms of specific illustrative embodiments, it is to be understood that the embodiments described herein are by way of example only and that the scope of the invention is not intended to be limited thereby.

Figure 1:
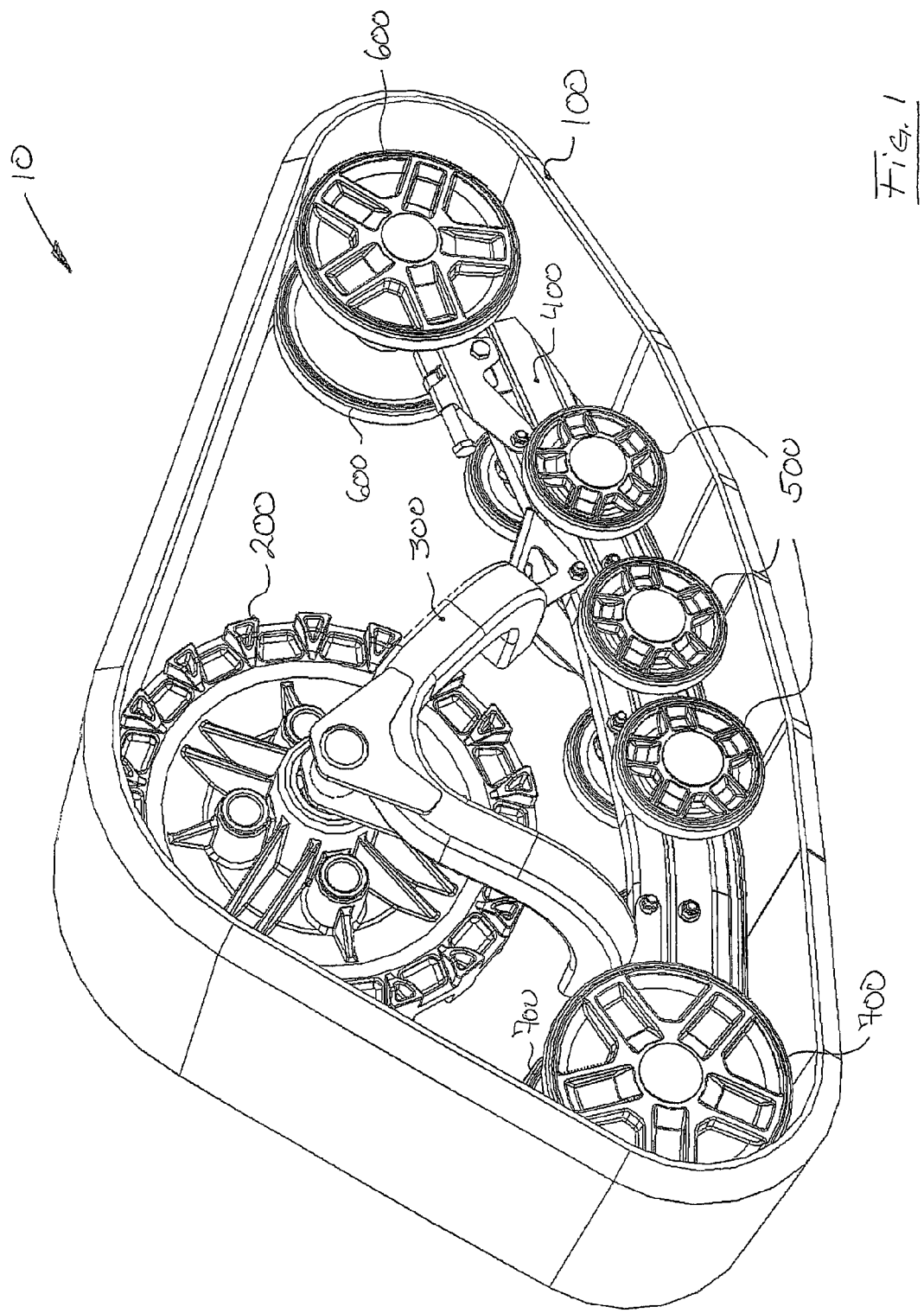
FIG. 1 is a perspective side view of a traction assembly embodying the principles of the invention.

Referring first to FIG. 1, a traction assembly 10 embodying the principles of the invention is shown. The traction assembly 10 comprises a sprocket wheel 200 adapted to be mounted to a shaft of a wheeled vehicle (not shown), a frame 300 coupled to the sprocket wheel 200, a guide rail 400 secured to the frame 300, idler wheels 600 and 700 respectively mounted that the fore and at the aft of the guide rail 400, and road wheels 500 mounted along the length of the guide rail, typically on each side thereof.

The traction assembly 10 also comprises an endless track 100, typically but not necessarily made of elastomeric material. The endless track 100 has an inner surface configured to cooperate, via a plurality of typically longitudinally aligned drive lugs and guide lugs (not shown for clarity), with the sprocket wheel 200, the idler wheels 600 and 700, the road wheels 500 and the guide rail 400. The endless track 100 also has an outer surface comprising a plurality of traction lugs (not shown for clarity) configured to engage the ground onto which the traction assembly 10 is operated.

Figure 2:
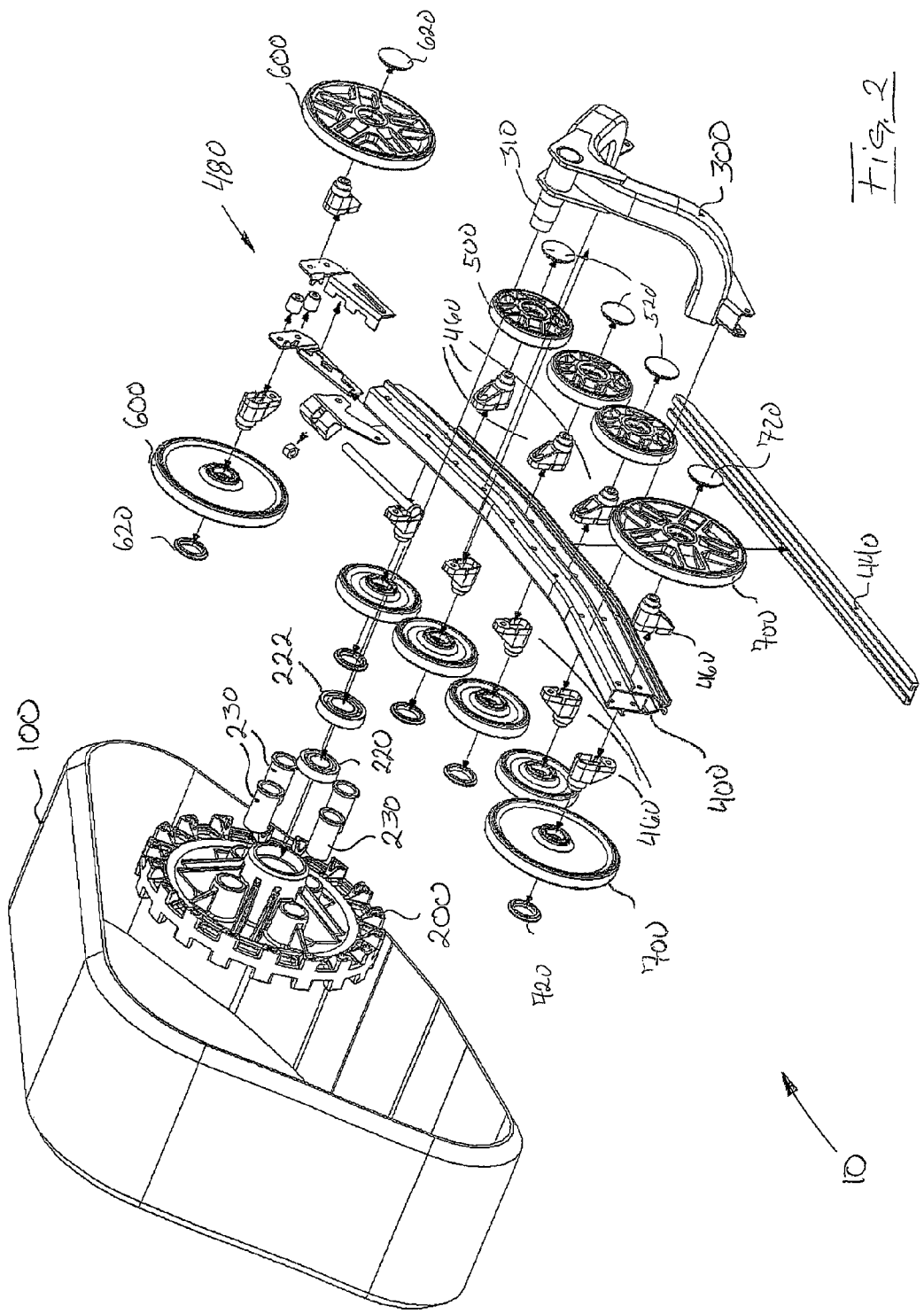
FIG. 2 is an exploded view of the traction assembly of FIG. 1.
Figure 3:
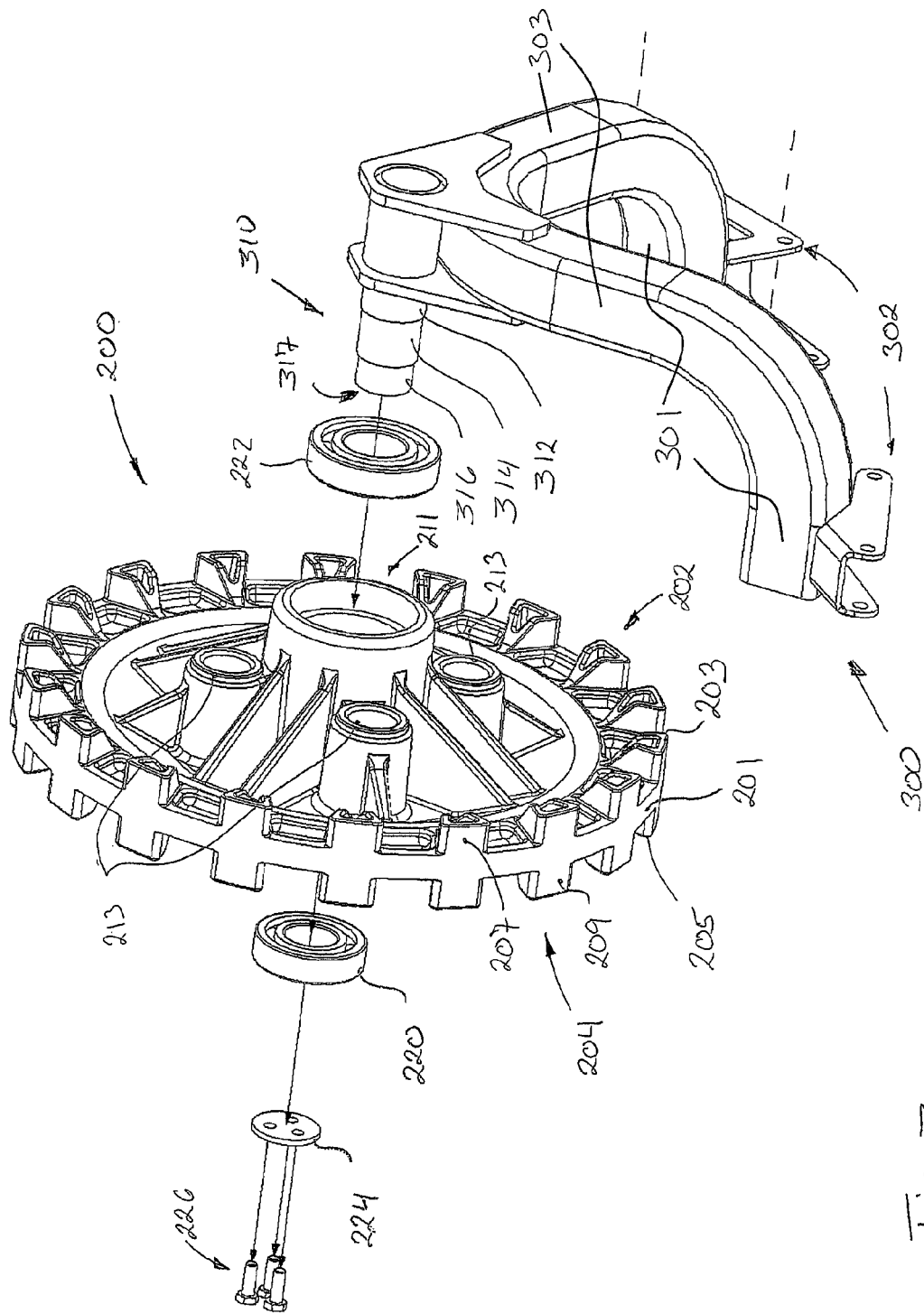
FIG. 3 is an exploded view of the sprocket wheel and frame of the traction assembly of FIG. 1.

Referring now to FIGS. 1, 2 and particularly FIG. 3, the configurations of the sprocket wheel 200 and the frame 300 are illustrated in more details.

The sprocket wheel 200 is typically circular in shape and preferably, but not exclusively, made from light yet resistant material such as ultra high molecular weight polyethylene ("UHMW-PE"). Still, other material could be used; the present invention is not so limited.

The sprocket wheel 200 defines a first side 202 and a second side 204. The sprocket wheel 200 also defines an outer track engaging circumferential surface 201. Respectively laterally extending from the first surface 202 and the second surface 204 are equally spaced sprocket teeth 203 and 205. The sprocket teeth 203 and 205 are configured to conventionally engage the drive lugs (not shown) disposed on the inner surface of the endless track 100.

The skilled addressee will note that the sprocket teeth 203 and 205 respectively have surfaces 207 and 209 which are preferably coextensive with the outer engaging circumferential surface 201. These additional surfaces 207 and 209 provide for a better engagement between the sprocket wheel 200 and the inner surface of the endless track 100.

The sprocket wheel 200 also comprises a central bore 211 configured to receive ball bearings 220 and 222 and the axle 310 of the frame 300 which will be described in more details below. The central bore 211 is preferably configured such that the ball bearing 220 and 222 can be mounted directly therein, eliminating thereby the need for a costly and heavy ball bearing cage.

Disposed around the central bore 211 are four smaller bores 213 configured to receive the fasteners used to secure the sprocket wheel 200 to the shaft or wheel hub of the vehicle. As shown in FIG. 2, the bores 213 have mounted therein metallic sleeves 230. Understandably, the number of bores 213 can vary according to the configuration of the shaft (not shown) onto which the sprocket wheel 200 will be mounted; the present invention is thus not limited to four bores 213.

Still referring to FIG. 3, the frame 300 typically comprises a lower portion 301 adapted to be secured to the guide rail 400 (described in more details below) via appropriate mounting brackets 302, and an upper portion 303 from which extends the axle 310. Though the frame 300 is more or less inverted V-shaped, it is to be understood that other shapes could be used.

In the preferred embodiment, and as best depicted in FIGS. 2 and 3, the upper portion 303 of the frame 300 is laterally offset with respect to the lower portion 301. Though not necessary, the offset is preferred in order to provide space for the sprocket wheel 200 and to allow the sprocket wheel 200 to be located approximately above the guide rail 400 during use.

The axle 310 of the frame 300 is typically fixedly mounted thereto though it could possibly be integrally formed there-with. The axle 310 preferably extends in the space provided by the offset between the upper portion 303 and the lower portion 301. The axle 310 typically comprises three portions 312, 314 and 316 having decreasing diameters. The diameters of portions 312 and 316 respectively correspond to the inner diameters of the ball bearings 222 and 220. This particular configuration prevents the sprocket wheel 200, and the ball bearings, to be installed the wrong way. Understandably, the axle 310 could also be simply cylindrical; the present invention is not so limited.

The end face 317 of the axle 310 is also preferably provided with one or more openings (not shown) for receiving one or more fasteners 226 (e.g. screws, bolts, etc.) used to fasten the cap 224 which secures the sprocket wheel 200, and the ball bearings 220 and 222, to the axle 310.

The skilled addressee will note that by having the ball bearings 220 and 222 directly mounted into the central bore 211 of the sprocket wheel and by mounting the sprocket wheel 200 directly to the axle 310, the present assembly 10 eliminates the need for a costly and heavy rolling bearing cage typically found on prior art traction assemblies. The present configuration is therefore less complex and less expensive to manufacture.

Referring now to FIGS. 1, 2, 4 and 5, the configuration of the guide rail 400 is illustrated in more details.

The guide rail 400 typically comprises a main structure 420, a sliding band 440 mounted to the underside of the main structure 420, a plurality of wheel supporting elements 460 mounted on each side of the main structure 420, and a track tensioning assembly 470 mounted preferably at the fore of the main structure 420.

Referring now to FIGS. 2 and 4, the main structure 420 is preferably an elongated aluminum extrusion having a generally arcuate shape. It is to be understood that the main structure 420 could be made by another forming process and could be made using other material (e.g. metal, metallic alloy, plastic, composite, etc.); the present invention is not so limited. In addition, though the shape of the main structure 420 depicted in FIG. 4 is more or less angular, the main structure 420 could alternatively be shaped as a continuous curve. Furthermore, the main structure 420 is preferably hollow in order to reduce the weight thereof.

The lower portion 422 of the main structure 420 is typically configured to receive the sliding band 440 which will be described below. In the present exemplary embodiment, the lower portion 422 is substantially shaped as an inverted "T" and preferably extends along at least a predetermined length of the main structure 420. As the skilled addressee would understand, the inverted T-shaped portion is configured to engage a complementary channel 441 provided or formed in the sliding band 440.

The sides 423 and 424 of the main structure 420 are respectively provided with mounting ribs 425 and 426 and mounting holes 427 and 428. The mounting ribs 425 and 426 are configured to receive and support the wheel mounting elements 460. Understandably, the mounting holes 427 and 428 are configured to receive the fasteners (e.g. screws, bolts, etc.) used to secure the wheel mounting elements 460 to the main structure 420 (see FIG. 1).

The sliding band 440 is typically made from a material having a low coefficient of friction such as to reduce the friction between the sliding band 440 and the inner surface of the endless track 100. As mentioned above and as depicted in FIG. 4, the sliding band 440 is provided with an inverted T-shaped channel 441 adapted to receive the inverted T-shaped portion of the main structure 420. Hence, as the skilled addressee would understand, the sliding band 440 can be slid onto the lower portion 422 of the main structure 420. Still, it is to be understood that other complementary shape as well as other mounting arrangements could be used instead.

The wheel mounting elements 460 of the guide rail 400 are configured to pivotally support the road wheels 500 and the idlers wheels 600 and 700 which, as shown in FIG. 2, may further respectively support wheel caps 520, 620 and 720. Each mounting element 460 comprises a wheel receiving portion 461, adapted to receive a wheel, and a mounting portion 462 adapted to engage the main structure 420. As best shown in FIG. 4, the mounting portion 462 is preferably provided with a notch 463 configured to mate with the rib 425 or 427. The wheel mounting element 460 can thus rest on the rib 425 or 426 when mounted to the main structure 420.

Referring now to FIGS. 2 and 5, the track tensioning assembly 470 is illustrated in more detail.

The track tensioning assembly 470 typically comprises a pair of sliding brackets 471 and 472 typically configured to be mounted together at the fore of the main structure 420 and adapted to support idler wheels 600 via wheel support elements 460 (see FIG. 1). The sliding brackets 471 and 472 are adapted to be secured to the main structure 420 via a push-bolt supporting bracket 490 itself adapted to be fixedly mounted to the main structure 420 (see FIG. 1) via fasteners (e.g. screws, bolts, etc.).

The sliding brackets 471 and 472 respectively comprise sliding portions 473 and 474 and wheel supporting portions 477 and 478. The sliding portions 473 and 474 are respectively provided with elongated openings 475 and 476 for allowing sliding displacement of the brackets 471 and 472. Understandably, the length of the openings 475 and 476 generally define the amplitude of the sliding movement of the sliding brackets 471 and 472.

The wheel supporting portions 477 and 478 are respectively provided with openings 479 and 480, similar to openings 427 and 428 of the main structure 420, for receiving the fasteners (e.g. screws, bolts, etc.) used to secure the wheel supporting elements 460 to the sliding brackets 471 and 472.

In order to improve the structural integrity of the track tensioning assembly 470, spacers 485 could be provided between the wheel support portions 477 and 478 of the sliding brackets 471 and 472.

For its part, the push-bolt support bracket 490 comprises a mounting portion 491 and a push-bolt supporting portion 493 depending thereon. The mounting portion 491 is provided with openings 492 for receiving the fasteners (e.g. screws, bolts, etc.) used to secure the push-bolt supporting bracket 490 to the main structure 420.

As best shown in FIG. 1, when the push-bolt support bracket 490 is mounted to the main structure 420, one of the fasteners used to secure the push-bolt support bracket 490 also extends through the openings 475 and 476 of the sliding brackets 471 and 472.

Returning to FIG. 5, the push-bolt supporting portion 493 is provided with a central passage for allowing the bolt 498 to extend therethrough. The push-bolt supporting portion 493 is also provided with a nut receiving notch or cavity for receiving a nut 499 used for maintaining the position of the bolt 498.

As partially shown in FIG. 1, the track tensioning assembly 470 is configured such that the bolt 498 will abut on the sliding brackets 471 and 472. To adjust the tension in the endless track 100, the bolt 498 needs only to be threaded, depending on the tension needed, to further push the sliding brackets 471 and 472 to increase the tension or to allow them the slide back to reduce the tension.

As the skilled addressee will understand, due to the modularity of the above-described traction assembly 10, each component of the traction assembly 10 can be more easily manufactured and the traction assembly 10 itself can be more easily assembled and requires less soldering. In that sense, the traction assembly 10 is generally less expensive than prior art traction assemblies.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A traction assembly for use on a vehicle, said traction assembly comprising:
    a) a frame having a lower portion and an upper portion, said upper portion being laterally offset with respect to said lower portion, said frame comprising an axle laterally extending from said upper portion;
    b) a sprocket wheel mounted to said axle;
    c) a longitudinally extending guide rail mounted to said lower portion of said frame, said guide rail comprising a first side and a second side and each of said sides comprising a longitudinally extending rib;
    d) wheel mounting elements mounted to said guide rail such as to engage one of said ribs, each of said wheel mounting elements comprising a notch for receiving one of said ribs;
    e) wheels coupled to said mounting elements;
    f) a traction band disposed around said sprocket wheel, said wheels and said guide rail.

2. A traction assembly as claimed in claim 1, wherein said guide rail has a lower portion, said lower portion being provided with a sliding band.

3. A traction assembly as claimed in claim 1, wherein said axle is substantially vertically aligned with said lower portion of said frame.

4. A traction assembly as claimed in claim 3, wherein said axle comprises at least two portions having different diameters.

5. A traction assembly as claimed in claim 3, wherein said axle comprises three portions having different diameters.

6. A traction assembly as claimed in claim 1, wherein said sprocket wheel is substantially vertically aligned with said guide rail.

7. A traction assembly for use on a vehicle, said traction assembly comprising:
    a) a sprocket wheel configured to be mounted to said vehicle, said sprocket wheel comprising a central opening;
    b) a frame comprising a lower portion and an upper portion, said upper portion being laterally offset with respect to said lower portion, said upper portion comprising a fixed axle laterally extending therefrom, said axle having a free extremity configured to face said vehicle when said traction assembly is mounted thereto, said axle being pivotally received into said central opening;
    c) wheels pivotally mounted to said lower portion of said frame;
    d) a traction band disposed around said sprocket wheel, said wheels and said frame.

8. A traction assembly as claimed in claim 7, wherein said lower portion of said frame comprises a longitudinally extending guide rail and wherein said wheels are pivotally mounted to said guide rail.

9. A traction assembly as claimed in claim 8, wherein said guide rail comprises a first side and a second side, and wherein each of said sides comprises a longitudinally extending rib.

10. A traction assembly as claimed in claim 9, comprising, for each of said wheels, a wheel mounting element, and wherein said wheel mounting elements are configured to engage said ribs.

11. A traction assembly as claimed in claim 10, wherein each of said wheel mounting elements is provided with a notch for receiving one of said ribs.

12. A traction assembly as claimed in claim 8, wherein said guide rail has a lower portion, said lower portion having mounted thereto a sliding band.

13. A traction assembly as claimed in claim 7, wherein said axle is substantially vertically aligned with said lower portion of said frame.

14. A traction assembly as claimed in claim 13, wherein said sprocket wheel is substantially vertically aligned with said lower portion of said frame.

15. A traction assembly as claimed in claim 7, wherein said axle comprises at least two portions having decreasing diameters toward said free extremity.

16. A traction assembly as claimed in claim 15, wherein said central opening in said sprocket wheel comprises at least two bearings mounted therein.

17. A traction assembly as claimed in claim 16, wherein said traction assembly comprises a retaining element releasably mounted at said free extremity of said axle for securing said sprocket wheel to said axle.

18. A traction assembly as claimed in claim 7, wherein said axle comprises at least three portions having decreasing diameters toward said free extremity.

19. A traction assembly as claimed in claim 18, wherein said central opening in said sprocket wheel comprises at least two bearings mounted therein.

20. A traction assembly as claimed in claim 19, wherein said traction assembly comprises a retaining element releasably mounted at said free extremity of said axle for securing said sprocket wheel to said axle.

* * * * *